United States Patent [19]
Sellstedt et al.

[11] 3,915,964
[45] Oct. 28, 1975

[54] 6 AND 7-(2-CYANO-2-CYCLOHEXYLACETAMIDO)PENICILLANIC AND CEPHALOSPORANIC ACIDS

[75] Inventors: John H. Sellstedt, King of Prussia; Daniel M. Teller, Devon; Charles J. Guinosso, King of Prussia, all of Pa.

[73] Assignee: American Home Products Corporation, New York, N.Y.

[22] Filed: June 18, 1973

[21] Appl. No.: 371,336

[52] U.S. Cl............ 260/243 C; 424/246; 260/239.1; 424/271
[51] Int. Cl.[2]........................................ C07D 501/20
[58] Field of Search................................ 260/243 C

[56] References Cited
UNITED STATES PATENTS
3,483,197   12/1969   Bickel et al.................... 260/243 C Primary Examiner—Nicholas S. Rizzo
Attorney, Agent, or Firm—Stephen Venetianer

[57] ABSTRACT

This invention is directed to novel penicillin and cephalosporin compounds represented by the following structural formulae:

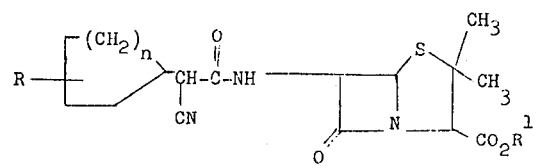

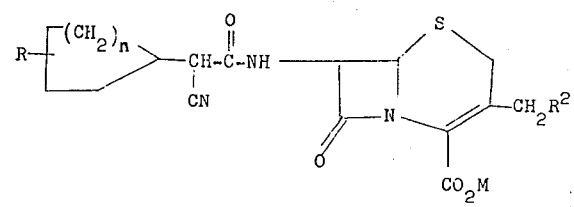

wherein R, $R^1$, $R^2$, M and n are defined herein. These compounds have been found to have useful antibacterial properties.

5 Claims, No Drawings

6 AND 7-(2-CYANO-2-CYCLOHEXYLACETAMIDO)-PENICILLANIC AND CEPHALOSPORANIC ACIDS

FIELD OF THE INVENTION

This invention relates to derivatives of 6-amino penicillanic acid (6-APA) and 7-amino cephalosporanic acid (7-ACA). More particularly this invention relates to 6 and 7-(2-cyano-2-cyclohexylacetamido)penicillanic and cephalosporanic acids.

SUMMARY OF THE INVENTION

This invention relates to the following novel derivatives of 6-APA and 7-ACA represented by the following structural formulae:

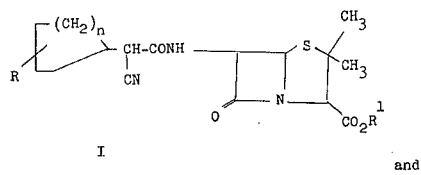

I and

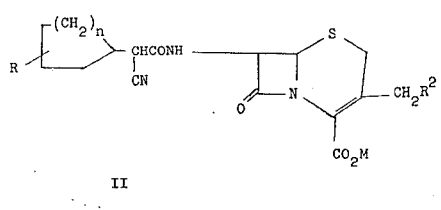

II wherein

R is hydrogen or lower alkyl;
$n$ is an integer from 1 to 4;
$R^1$ is hydrogen or a pharmaceutically acceptable cation;
$R^2$ is hydrogen, acetoxy, a quaternary ammonium cation or sulfur wherein the sulfur atom is attached to a heterocyclic nucleus and M is hydrogen, a pharmaceutically acceptable cation or an anionic charge when $R^2$ is a quaternary ammonium radical.

DESCRIPTION OF THE INVENTION

As used herein the term "(lower) alkyl" means a straight or branched chain hydrocarbon radical having $C_1 - C_6$ carbon atoms. Illustrative of (lower)alkyl is methyl, ethyl, isopropyl, butyl, sec-butyl, and hexyl. Illustrative of the term "heterocyclic nucleus" is imidazolyl, imidazolinyl, oxazolyl, oxazolinyl, thiazolyl, thiazolinyl, 1,2,4-triazolyl, 1,3,4-dithiazolyl, 1,2,4-thiadiazolyl, pyrimidyl, 1,2,4-triazinyl, 1,3,5-triazinyl, 1,3-thiazinyl, 1,3,4-thiadiazinyl, 1,3,5-thiadiazinyl, 1,3,4-oxadiazinyl, 1,3,5-dioxazinyl. The term "quaternary ammonium cation" is exemplified by pyridinyl.

The preferred compounds of the present invention are represented by the following structural formulae:

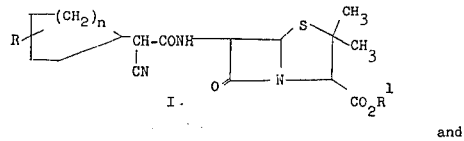

I.

and

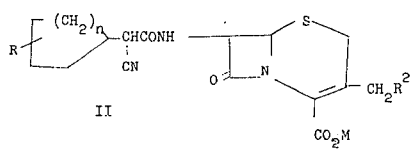

II wherein R is hydrogen, $R^1$ is hydrogen or a pharmaceutically acceptable salt, $R^2$ is acetoxy, M is hydrogen or a pharmaceutically acceptable salt and $n$ is one or two.

The compounds of this invention can be prepared in the following manner:

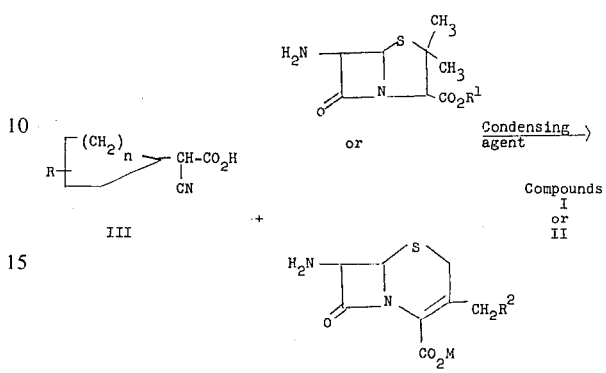

wherein R, $R^1$, $R^2$, M and $n$ are as described above. The condensing agent can be any well-known compound used for this purpose. Illustrative of preferred condensing agents are carbonyl diimidazole, dicyclohexylcarbodiimide (DCC), DCC with N-hydroxysuccinimide, DCC with 1-hydroxybenzotriazole and isobutylchloroformate.

Alternately, compounds represented by formulae I and II may be prepared by reacting the acid chloride of the compound represented by formula III with an aqueous solution of a tertiary amine or alkali metal salt of 6APA or 7ACA, a silylated 6-APA or 7-ACA derivative, a phosphorylated 6-APA or 7-ACA derivative or a saccharin derivative of 6-APA or 7-ACA. This is followed by hydrolysis in order to form compounds of formulae I and II.

As will be understood by those skilled in the art, the compounds of Formula I and II may be utilized in their acid form or in the form of the therapeutically-active salts thereof, e.g., the sodium or potassium salts etc., or in the form of the pharmaceutically acceptable acid addition salts prepared by the reaction of the novel penicillin and cephalosporin compounds with an amine or diamine base, e.g., procaine or various N-N'-disubstituted alkylene diamines, such as N,N'-dibenzylethylenediamine, etc.

The new compounds of the series defined above show desirable broad spectrum anti-bacterial activity and are useful as therapeutic agents for poultry and mammals in the treatment of infectious diseases caused by gram-positive and gram-negative bacteria by either parenteral or oral administration, particularly strains of *Staphylococcus aureus*, *Bacillus subtilis*, *staphylococcus aureus* CHP and strepococcus pyogenes.

As will be also be understood by those skilled in the art, the compounds of the invention may be utilized in suitable dosage forms, including solutions, suspensions, tablets, capsules, and the like.

The following examples are illustrative of the invention.

EXAMPLE 1

7-(2-cyano-2-cyclohexylacetamido)cephalosporanic acid, potassium salt

To a solution of 2-cyano-2-cyclohexylacetic acid (0.42 g, 0.0025 moles) in dry dimethylformamide (4.0 ml) at room temperature is added carbonyl diimidazole (0.41 g, 0.0025 moles) under nitrogen. Carbon dioxide evolution begins immediately. After 30 minutes at room temperature, the residual carbon dioxide is removed under vacuum, the mixture cooled to −10°C and a solution of 7-ACA (0.68 g, 0.00095 moles) in dry methylene chloride (10 ml) containing triethylamine (1.04 ml) is added all at once. After stirring 2 hours at room temperature, the mixture is concentrated in vacuo < 40°. n-Butanol (2.5 ml) is added, then potassium ethyl hexanoate (1.25 ml of 2M. solution in n-butanol). After stirring 10 minutes, ethyl ether (100 ml) is added, the product filtered and dried in vacuo at room temperature to yield a tan solid, mp. 150°–160° (d); $\lambda_{max}^{KBr}$ 5.72, 6.19 $\mu$; NMR has a sharp singlet at 2.10 ppm.

EXAMPLE 2

7-(2-cyano-2-cyclohexylacetamido)-3-methyl-8-oxo-5-thia-1-azabicyclo[4.2.0]oct-2-ene-2-carboxylic acid, potassium salt.

Using the procedure described in Example 1 but substituting diazabicyclononane (0.31 g) for triethylamine and 7-ADCA (0.53 g, 0.0025 moles) for 7-ACA giving the title compound mp. 153°–158° (d); $\lambda_{max}^{KBr}$ 5.70, 6.00 (shoulder), 6.30 $\mu$; NMR has sharp singlet at 1.95 ppm.

EXAMPLE 3

6-(2-cyano-2-cyclohexylacetamido)penicillanic acid potassium salt

Using the procedure described in Example 1 but substituting 6-APA (0.54 g, 0.0025 mole) for 7-ACA giving the title compound, mp. 108° (d); $\lambda_{max}^{KBr}$ 5.68, 6.00, 6.25 $\mu$; NMR has 1.01 and 1.62 ppm singlets.

The compounds of formulae I and II of this invention have been found to possess antibacterial activity. Antibacterial screening is carried out by agar serial dilution technique. Distilled water is used as a vehicle. The stock solution is prepared at 10,000 $\mu$g./ml. of substance in the vehicle. Two-fold dilutions are made with sterile water. One ml. quantities of each dilution are incorporated into 9 ml. seed agar in sterile petrie dishes. The hardened surface is inoculated with test organisms and incubated 18 hours at 35°C. The end point is reported as a minimal inhibitory concentration (MIC) expressed in $\mu$g./ml.; the least amount of test substance that will completely inhibit the test organism. The compound of Example 3 when tested against *Staphylococcus aurus* Smith produced a MIC value of 0.488 $\mu$g./ml. and when tested against *Bacillus subtillus* produced a MIC value of 3.90 $\mu$g./ml. When tested against *Staphylococcus aureus* 6,538P the compound of Example 3 produced a MIC value of 0.244 $\mu$g./ml. The compound of Example 2 produced the following MIC values against the listed bacteria:

|   |   | MIC Value |
|---|---|---|
| 1. | Staphylococcus aureus SMITH | 3.90 |
| 2. | Staphylococcus aureus 6538P | 3.90 |
| 3. | Bacillus subtillus | 3.90 |

The compound of Example 1 produced the following MIC values against the listed bacteria:

|   |   | MIC Value |
|---|---|---|
| 1. | Staphylococcus aureus SMITH | .244 |
| 2. | Staphylococcus aureus 6538P | .244 |
| 3. | Bacillus subtillus | .122 |

The compound of Example 1 was also tested for its therapeutic action on various bacterial infections in animals. This test is carried out by injecting mice intraperitoneally with 0.5 ml. of standardized suspension of the infective agent in 5% gastric mucin. The mice are randomized and treated with the experimental compound within one-half hour to one hour of randomization. A second dose is injected 6 hours later. Twenty-four hours later all surviving animals receive a third dose of the experimental compound. 10 percent of the injected mice are injected with a standard such as penicillin G. The mice are observed for a period of 14 days and deaths are recorded daily.

Curative dose values (CD$_{50}$) are determined by the method of Reed and Munench (American Journal of Hygiene, Vol. 27, Page 493, (1938) ). The curative dose for compound one against Staphylococcus aureus CHP was 7.2 mg. and against Strep. Pyogenes C203 was 2.25 mg.

What is claimed is:

1. A compound selected from the group consisting of

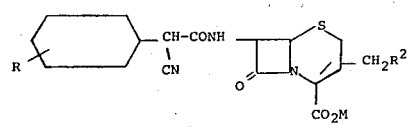

wherein R is selected from the group consisting of hydrogen and lower alkyl; $R^2$ is selected from the group consisting of hydrogen, acetoxy and a pyridinyl cation and M is selected from the group consisting of hydrogen and a pharmaceutically acceptable cation.

2. A compound according to claim 1 wherein R is hydrogen.

3. A compound according to claim 1 wherein $R^2$ is acetoxy.

4. A compound according to claim 1 wherein the compound is 7-(2-cyano-2-cyclohexylacetamido)cephalosporanic acid, potassium salt.

5. A compound according to claim 1 wherein the compound is 7-(2-cyano-2-cyclohexylacetamido)-3-methyl-8-oxo-5-thia-1-azabicyclo[4.2.0]oct-2-ene-2-carboxylic acid, potassium salt.

* * * * *